(12) United States Patent
Floyd et al.

(10) Patent No.: US 8,276,015 B2
(45) Date of Patent: Sep. 25, 2012

(54) MANAGING THE POWER-PERFORMANCE RANGE OF AN APPLICATION

(75) Inventors: Michael S. Floyd, Austin, TX (US);
Karthick Rajamani, Austin, TX (US);
Freeman L. Rawson, III, Austin, TX (US);
Malcolm S. Ware, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 432 days.

(21) Appl. No.: 12/390,686

(22) Filed: Feb. 23, 2009

(65) Prior Publication Data
US 2010/0218029 A1 Aug. 26, 2010

(51) Int. Cl.
*G06F 1/06* (2006.01)
*G06F 1/32* (2006.01)

(52) U.S. Cl. ........................... 713/601; 713/322
(58) Field of Classification Search ............... 713/322, 713/600, 601; 702/182
See application file for complete search history.

(56) References Cited

U.S. PATENT DOCUMENTS

| | | | |
|---|---|---|---|
| 5,493,684 A | 2/1996 | Gephardt et al. | |
| 5,623,647 A | 4/1997 | Maitra | |
| 5,719,800 A | 2/1998 | Mittal et al. | |
| 5,832,280 A | 11/1998 | Swanberg | |
| 6,711,447 B1 * | 3/2004 | Saeed | 700/82 |
| 7,062,933 B2 * | 6/2006 | Burns et al. | 62/259.2 |
| 7,111,179 B1 | 9/2006 | Girson et al. | |
| 7,174,468 B2 | 2/2007 | Gary et al. | |
| 7,272,730 B1 | 9/2007 | Acquaviva et al. | |
| 7,376,849 B2 * | 5/2008 | Tschanz et al. | 713/322 |
| 7,636,863 B2 * | 12/2009 | Oh | 713/320 |
| 7,904,287 B2 * | 3/2011 | Lefurgy et al. | 703/21 |
| 7,917,785 B2 * | 3/2011 | Jacobowitz et al. | 713/320 |
| 7,917,789 B2 * | 3/2011 | Fenger et al. | 713/322 |
| 7,941,583 B2 * | 5/2011 | Titone et al. | 710/306 |
| 2005/0223258 A1 * | 10/2005 | Watts, Jr. | 713/322 |
| 2005/0289365 A1 * | 12/2005 | Bhandarkar | 713/300 |
| 2007/0094525 A1 | 4/2007 | Uguen et al. | |
| 2007/0245165 A1 | 10/2007 | Fung | |
| 2007/0266385 A1 * | 11/2007 | Flautner et al. | 718/102 |
| 2007/0283176 A1 | 12/2007 | Tobias et al. | |
| 2010/0115343 A1 | 5/2010 | Floyd et al. | |
| 2010/0146316 A1 * | 6/2010 | Carter et al. | 713/322 |
| 2010/0287396 A1 * | 11/2010 | Barth et al. | 713/323 |

OTHER PUBLICATIONS

"U.S. Appl. No. 12/263,597 Office Action", Jun. 14, 2011, 8 pages.
Anonymous, "MethodForProcessPerformanceStateTransitionTables", IPCOM000008932D Jul. 24, 2002, 4 pages.
Bui, Van et al., "A Component Infrastructure for Performance and Power Modeling of Parallel Scientific Applications", CBHPC, Karisruhe, Germany, ACM 978-1-60558-311 Oct. 14-17, 2008, 11 pages.
Chan, Hoi et al., "Green Applications: Software Applications that Optimize Energy Usage", OOPSLA, Montreal, Quebec, Canada, IBM T.J. Watson Research Center, ACM 978-1-59593-865 Oct. 21-25, 2007, 2 pages.
Curtis-Maury, Matthew et al., "Prediction-Based Power-Performance Adaptation of Multithreaded Scientific Codes", IEEE Transactionjs on Parallel and Distributed Systems, vol. 19, No. 10 Oct. 2008, 15 pages.
IBM, et al., "Method for Managing Power Savings within a Resource Set of Processors", IPCOM000187931D Sep. 18, 2009, 2 pages.

* cited by examiner

*Primary Examiner* — Glenn A Auve
(74) *Attorney, Agent, or Firm* — DeLizio Gilliam, PLLC (57) ABSTRACT

Semiconductor device circuits and methods are provided for adjusting core processor performance based on usage metrics. Metric detection and adjustment are performed in digital logic hardware guided by registers providing maximum and minimum frequency settings, without intervening input from system software or firmware, thus greatly speeding the processor performance adjustment. Power-performance drivers provide applications or the operating system ability to specify maximum and minimum frequency requirements.

15 Claims, 5 Drawing Sheets

MANAGING THE POWER-PERFORMANCE RANGE OF AN APPLICATION

TECHNICAL FIELD OF THE INVENTION

This invention relates to improving energy efficiency in microprocessors, and more specifically to systems on board the microprocessor integrated circuit for managing the power-performance range of an application by providing ability to specify a minimum and maximum frequency range.

BACKGROUND OF THE INVENTION

Processors in computers employ variable power-performance states to match operating states to processor load. Modern processors incorporate dynamic voltage and frequency scaling as integral mechanisms to tailor operating states. These operating state changes are typically managed by the operating system or system firmware using explicit, special instructions to cause processor operating state change. Management of these states by the system software layer is typically designed to take a conservative approach, and therefore limits the benefits that can be extracted using the state change mechanisms.

Further, management systems and methods historically have utilized a single operational point to select performance at a given time instant. This traditional scheme, however, inhibits degrees of freedom that may exist in the underlying system where it may be possible to vary operational points in a much faster manner to track very short time interval behavior that is unseen and unmanageable by the higher levels of the system. System software is typically unaware of the fine-grain variations in workload characteristics that rapidly alter the performance-level required from the hardware.

SUMMARY OF THE INVENTION

This invention provides a means to support power-performance trade-offs for any given time interval, within a range set by the higher level controller. Semiconductor device circuits and methods are provided for adjusting core processor performance based on usage metrics. Metric detection and adjustment are performed in digital logic hardware guided by registers providing maximum and minimum frequency settings, without intervening input from system software or firmware, thus greatly speeding the processor performance adjustment. Power-performance drivers provide applications or the operating system ability to specify maximum and minimum frequency requirements.

During low IPC (instructions per cycle) and/or low activity, a CPU core is rapidly adjusted to a minimum frequency value providing a lower power-performance state. This is done with a hardware-only solution built into the CPU semiconductor device. The adjustment may include dropping frequency, voltage, or other power-performance characteristics. While current solutions require either the operating system or system firmware to identify when lower power-performance states are tolerable and issue the transition command, the preferred embodiments herein have no such requirement. Core usage is monitored and usage-level metrics calculated in hardware. Using the usage-level metrics, guided by the maximum and minimum frequency register values, the core power-performance state is chosen. A fast actuator is present in each system core to rapidly adjust the core power-performance state based on the selection.

One embodiment is an integrated circuit device including a processor core and core monitoring circuitry that indicates certain usage-level metrics of the processor core. Other metric values may be calculated in digital logic based on values provided by the core monitoring circuitry. The metrics are used by performance-state selection digital circuitry, together with register settings provided from the system power management driver, to select a desired performance state from among at least two possible desired performance states. Actuator circuitry adjusts the core power-performance state between at least a first and second level based on the selected state.

In preferred implementations, the integrated circuit device can adjust the core power-performance state within as short an interval as approximately 10 microseconds, after a usage sequence in which the processor core achieves an ongoing usage workload usage level corresponding to an adjustment. Some versions are even faster. In some versions performance-state selection digital circuitry is operable to compare a core usage metric value to a low threshold metric value, and when the usage metric is below the threshold, produce a desired performance state output value associated with a lowered activity power performance state. The range of adjustments is limited by settings in maximum and minimum frequency registers. In some versions the ongoing usage-level metrics of the processor core include a metric indicative of a number of active cycles in a given number of total cycles. Another preferred metric is indicates a number of completed instructions in a given interval. The intervals, and the maximum and minimum frequency registers, can be programmed from firmware. The circuitry can also be used to supplement existing software and firmware power-performance state control solutions.

Another implementation provides a method of improving the power efficiency of a processor, including setting minimum and maximum frequency values in registers associated with a processor core. The values may be provided by a particular application or by the system power-performance driver. After the registers are set, the method monitors a processor core to determine one or more selected ongoing usage-level metrics of the processor core. In response to detecting the change, a desired next core performance state is selected using core performance state selection circuitry. The state selection is bounded by the maximum and minimum frequency values set in their respective registers. Further, the selection preferably occurs in the performance state selection circuitry without receiving any data or control input from system software or firmware between detecting the change and selecting the desired next core performance state. After selecting the desired next core performance state, the method changes the performance state of the processor core using core performance actuator circuitry. This also happens without receiving any data or control input from system software or firmware between selecting the desired next core performance state and changing a performance state of the processor core.

The use of hardware digital logic without software intervention, rather than software or firmware-based solutions, can provide many advantages. The software solutions have only limited opportunities to examine metrics and initiate power-performance changes. Firmware performing the same task is also typically slow to respond. Real workloads can show much more fine-grained variation in frequency demands than the system software/firmware can react to. The preferred embodiments herein provide an automated hardware method for recognizing and acting upon opportunities for rapid state changes/scaling to match the fine-grained demands of workloads. This can improve the power-efficiency of the processor without sacrificing any performance, by matching the hardware operating state to the exact demands of the workload.

These and other advantages and features of the invention will be apparent from the following description of the preferred embodiments, considered along with the accompanying drawings.

DESCRIPTION OF PREFERRED EMBODIMENTS

Figure 1:
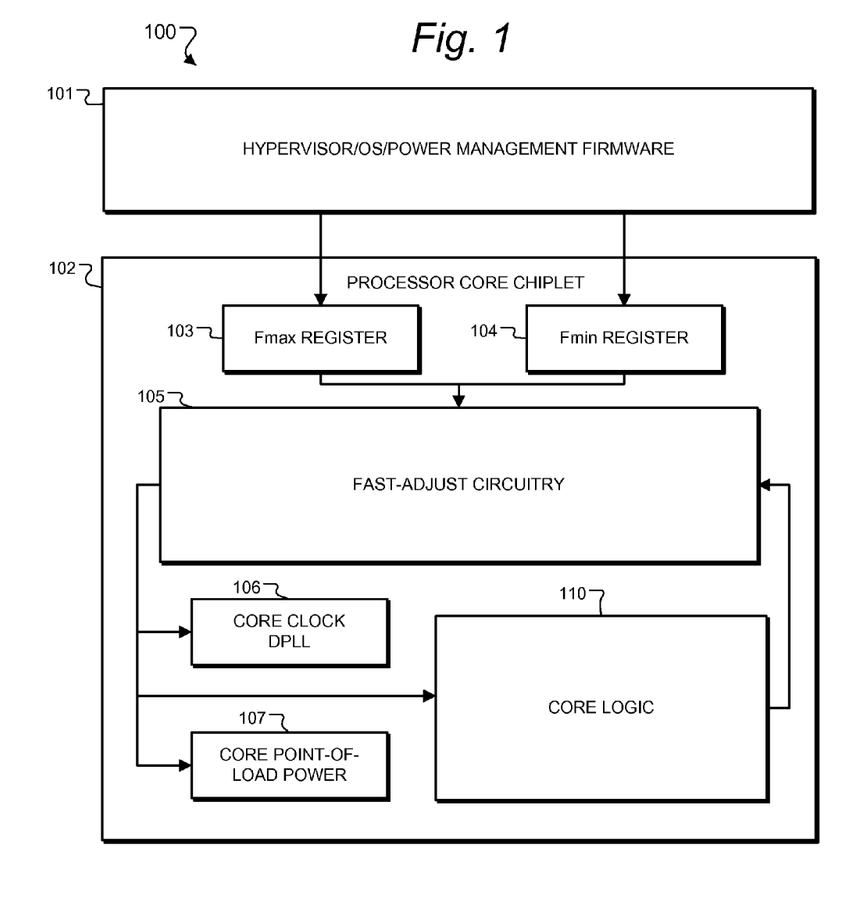
FIG. 1 is a high-level system block diagram of one preferred embodiment.

FIG. 1 is a high-level system block diagram of a computer system of one preferred embodiment. The depicted system 100 includes software portion 101 having an operating system or a hypervisor manager, for example, and includes power management software drivers and firmware. A preferred version also includes an API (application programming interface) exposing power management functions to applications that run on the operating system or on the hypervisor virtual machines. Power control API drivers provide access to configure automatic power control circuits within the depicted processor core chiplet 102.

The depicted chiplet 102 is, in a preferred embodiment, one of many processor core chiplets present on a single semiconductor device. As used herein, a chiplet is a complete subsystem IP core, or a semiconductor circuit instantiation of such a core, that may connect to interfaces both internal to a system-on-chip (SOC) and at its pads. Each chiplet typically contains several IP cores and the logic necessary for them to function together as a complete subsystem within an SOC, or a multi-core processor or other complex integrated circuit. Chiplet ports are typically defined to be industry standard interfaces to avoid the need for additional interface logic. More than one such chiplet may exist on a single semiconductor device. While the depicted embodiment is described as having a chiplet, other embodiments may simply include processor cores, which may be of various types known in the industry to be used in single-core or multi-core processor devices. As such, in some embodiments, the depicted circuitry may be part of a processor core rather than a processor core chiplet.

As shown, process core chiplet 102 includes a maximum frequency register (Fmax) 103 and a minimum frequency register (Fmin) 104. These registers provide software configurable values which control the power management fast-adjust circuitry 105 by providing a range in which the circuitry may operate to control the processor core 110. The depicted connections are logical rather than strictly electrical. For example the software is, of course, expected to access the registers through operation of the processor core logic 110. Typically the registers will be considered as part of the core logic 110, but this is not limiting in various embodiments are defined by their function and not by their circuit location. As an example some embodiments may place the actual circuitry for the registers 103 and 104 outside of the area used by core logic 110. Registers 103 and 104 are not calculation registers employed by the processor core, but instead are control registers which store the value written to them and are operatively coupled to the fast-adjust circuitry 105 to limit the range in which the fast-adjust circuitry 105 may vary the processor core operating frequency at any given time.

The fast-adjust circuitry 105 is provided to automatically control the power-performance of the processor core logic 110 during operation, and may therefore also be referred to as power-performance control circuitry. Fast-adjust circuitry 105 is operatively coupled to the processor core, and operable to monitor a first selected ongoing usage-level metric of the processor core such as, for example, power usage, instructions per second, or other metrics such as a proxy value used to approximate power consumption of the processor core. Usage-level metrics will be further discussed below. Fast-adjust circuitry 105 is preferably physically distributed within the layout of the core logic in order to accurately count and measure events occurring in the core. The fast-adjust circuitry preferably includes monitoring and calculation circuitry which calculates certain metric values based on observed events in the core. The circuitry is preferably embodied as appropriate digital logic to count, add, divide, and scale observed core logic values as needed.

The fast-adjust circuitry 105 controls power-performance of core logic 110 through connections to the core clock 106 and the core point-of-load power supply 107. The fast-adjust circuitry 105 perfectly operates automatically without intervention from software to make short-term power-performance adjustments, as further described below. This typically enables greater power-performance efficiency than previous methods. Examples of fast-adjust circuitry are shown in the co-pending U.S. patent application Ser. No. 12/263,597, entitled METHOD FOR AUTOMATED PROCESSOR POWER MANAGEMENT FOR BETTER ENERGY-EFFICIENCY, by Karthick Rajamani et. al., filed on Nov. 3, 2008. This application is hereby incorporated by reference for all purposes. The core clock 106 and power supply 107 are both controllable within defined ranges. The fast-adjust circuitry 105 is also connected to core logic 110 and may set or control other power-performance features through that connection.

While fast-adjust monitor circuitry 105 is shown operatively coupled to core logic 110, the circuitry 105 is preferably physically distributed within the layout of the core logic in order to accurately count and measure events occurring in the core. Other embodiments may provide a separate region for circuitry 105 and the semiconductor layout. Fast-adjust circuitry 105 is operably coupled to the core clock and the core logic in such manner as to effect fast changes in power-performance operating state. Fast-adjust circuitry 105 may also be coupled to the core point-of-load power supply in order to make adjustments thereto, along with core clock changes. The depicted circuitry presents a hardware decision loop that operates, in preferred embodiments, without intervention from software or firmware in the digital logic decisions in operation of fast-adjust circuit 105, except to make configuration settings such as to set the values in the depicted registers 103 and 104. While this depicted embodiment shows the operating system configuring performance of fast-adjust circuit 105 by setting values and registers 103 and 104, many other configuration values may also be used in combination. For example, the above-incorporated co-pending patent application includes a scheme to configure multiple power-performance states to control operation of an automatic fast-adjust circuit coupled to the processor. The techniques disclosed therein may be used in any functional sub-combination along with the use of minimum and maximum frequency registers 103 and 104.

Previous techniques and software interfaces typically afforded a single selection for the power-performance state for a given time interval. However, the Applicants' analysis of the underlying behavior of a system during that time interval show complex behavior in power-performance characteristics. With a single selection specified for the entire time interval, typical prior art systems provide no opportunity to modify the power-performance state to better exploit this complex behavior. This is because power-performance trade-off algorithms running in firmware cannot be easily run on significantly shorter time scales. When such firmware is attempted, processing overhead can become an overly burdensome processor task. Another such task is the ability to communicate new power-performance states from a remote control point. Further, in such software systems, application requests to change power-performance states must pass through driver interfaces, further increasing the overhead of changes.

In preferred versions of the invention, a range of power-performance states is specified, instead of employing a single fixed power-performance state provided at an application API, a driver API, or a physical register interface. The range can then be exploited by the underlying software or hardware entity by observing and actuating on a finer time scale basis than something running above that software or hardware layer in the system complex behavior in power-performance characteristics. With previous systems that provide a single selection specified for the entire time interval, there is no opportunity to modify the power-performance state to better exploit this complex behavior.

The range in the present system is preferably specified by loading two values: an Fmin value, which provides the minimum allowed frequency that low-activity detect and other processor-level hardware feedback control systems can drop to, or the minimum allowed frequency used by a lower level software entity; and an Fmax value, which provides the maximum allowed frequency that processor-level hardware control systems can increase to or that a lower level software entity can raise the frequency to. One example of underlying hardware governed by such Fmax/Fmin settings is low activity detection hardware. Such hardware enables performance-power state to jump between Fmax and Fmin based on hardware activity levels measured on time scales that can be at least 10× shorter in duration than times achieved when power management software alters the range of Fmax/Fmin. Another example is a power proxy control loop control system in hardware that monitors power proxies (metrics indicative of power usage) and compares to power caps to see if frequency should be increased/decreased within the Fmax/Fmin constraints. In the preferred embodiment, there is a unique Fmax/Fmin set of registers for each individual chiplet on a processor chip.

The present system also provides extended software capabilities to accompany the hardware solutions provided. Some embodiments include a software API interface in which the applications calling the API must provide Fmax/Fmin parameters for the underlying drivers supporting that API. Underlying drivers then have the freedom to choose any frequency between Fmax/Fmin until another call is made to the API to change the range. Examples implementations of system software 101 may include range control Advanced Configuration and Power Interface (ACPI) drivers or Linux CPUFreq interfaces, which are augmented to support not just a single frequency selection at the software interface, but a range of frequencies. Lower level drivers would receive the range information and manage the frequency within that allowed range. Higher level middle-ware may be provided to communicate a frequency range to an application layer, allowing the application to make performance/power state changes anywhere in the range given by the middle-ware. Some versions of this invention can be embodied in hardware by providing a set of registers that describe Fmax/Fmin for a given processor chip or a individual chiplet among N chiplets inside a chip assuming said chiplet can have independent frequency control from other chiplets on the same processor chip.

Figure 2A:
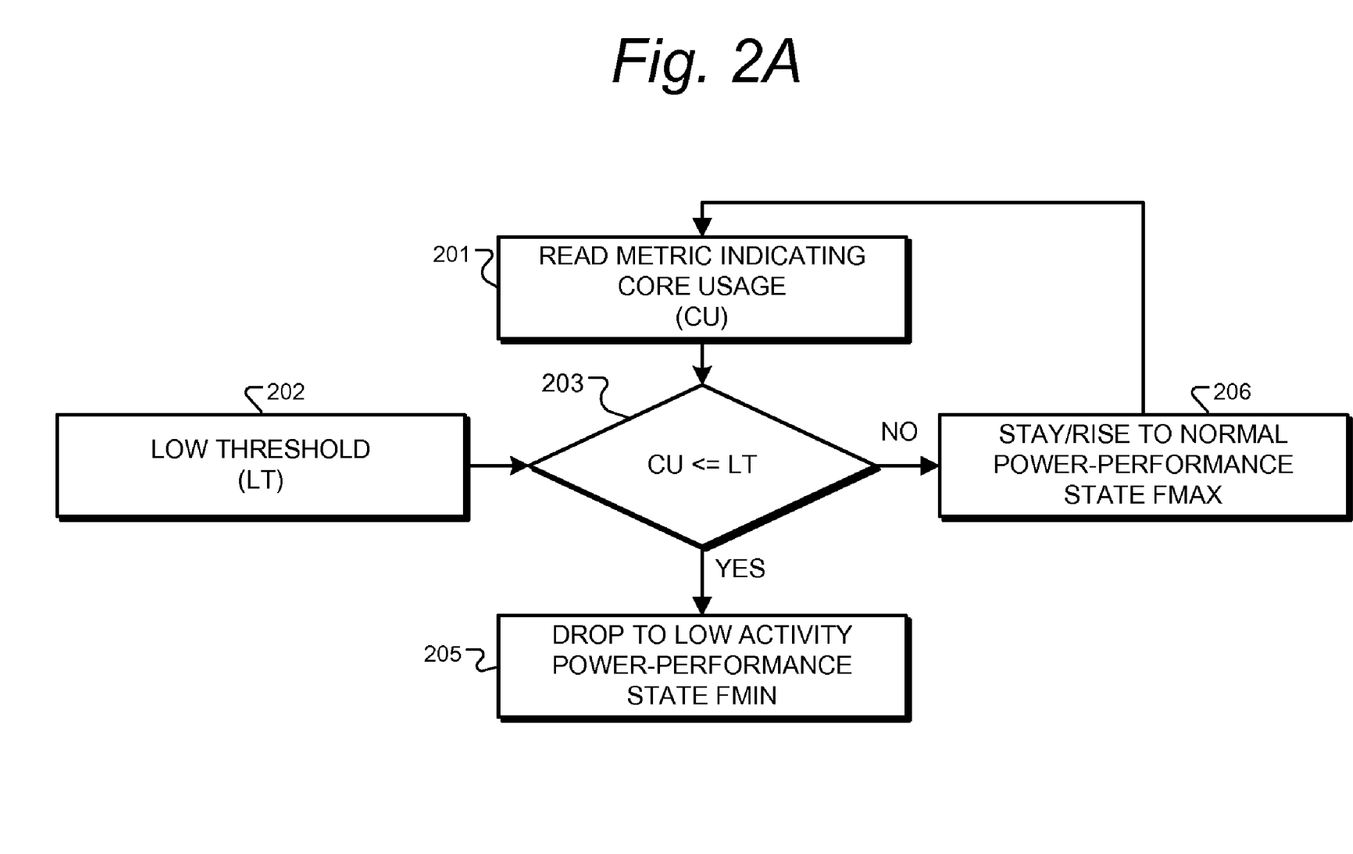
FIG. 2A shows a flowchart of a power-performance control scheme according to one embodiment.

FIG. 2A is a flowchart of a power-performance control scheme according to one embodiment. This version shows a simplified power-performance control scheme using a simple threshold level based on core usage. The depicted process takes place entirely in circuitry on a semiconductor device, without intervening software or firmware steps. The block diagram assumes that the registers 103 and 104 have already been set. These settings provide the Fmin (low-activity) state and the Fmax (high activity state) values used in the depicted process. At block 201 a core usage metric is measured or otherwise calculated. Examples of this metric are further described below, but is preferably a quantity or ratio involving the number of instructions executed by the core on ongoing basis. Other suitable power proxy metrics may also be used. Whatever metric is used, that value enters the decision process block 203. At this step, the core usage (CU) is compared to a low threshold level (LT), which is shown as a configurable item at block 202. If the core usage metric is equal to or lower than the low threshold, the process goes to block 205. When this happens, the system adjusts the power-performance state of the core to a lower power-performance state suitable for low processor core activity, typically by setting the processor core clock to the lower frequency (Fmin). If, at block 203, the core usage metric is higher than the low threshold, the process goes to block 206, where the power-performance state is either raised to Fmax, or maintained if Fmax is already used. This example, of course, is one of the simpler versions of the invention.

Complexity of exit logic for low performance state that will eventually be reached by block 205 is highly dependent on the relationships between the core usage power proxy metric used, the threshold values, the core usage computation interval, and actuation latency of the core DPLL (digital phase-locked loop). A desire for simpler logic can dictate narrower usage scenarios or different choices of core usage metrics and tuning of the threshold value and core usage computation interval. In one example embodiment, the exit logic is a simple core-usage-reset-on-use scheme which targets primarily idle interval power reduction with IPC (instructions per cycle) as the core usage metric, using the low threshold LT<0.01 with approximately 10 micro-second computation interval using DPLLs that have an order of magnitude lower actuation latency.

Figure 2B:
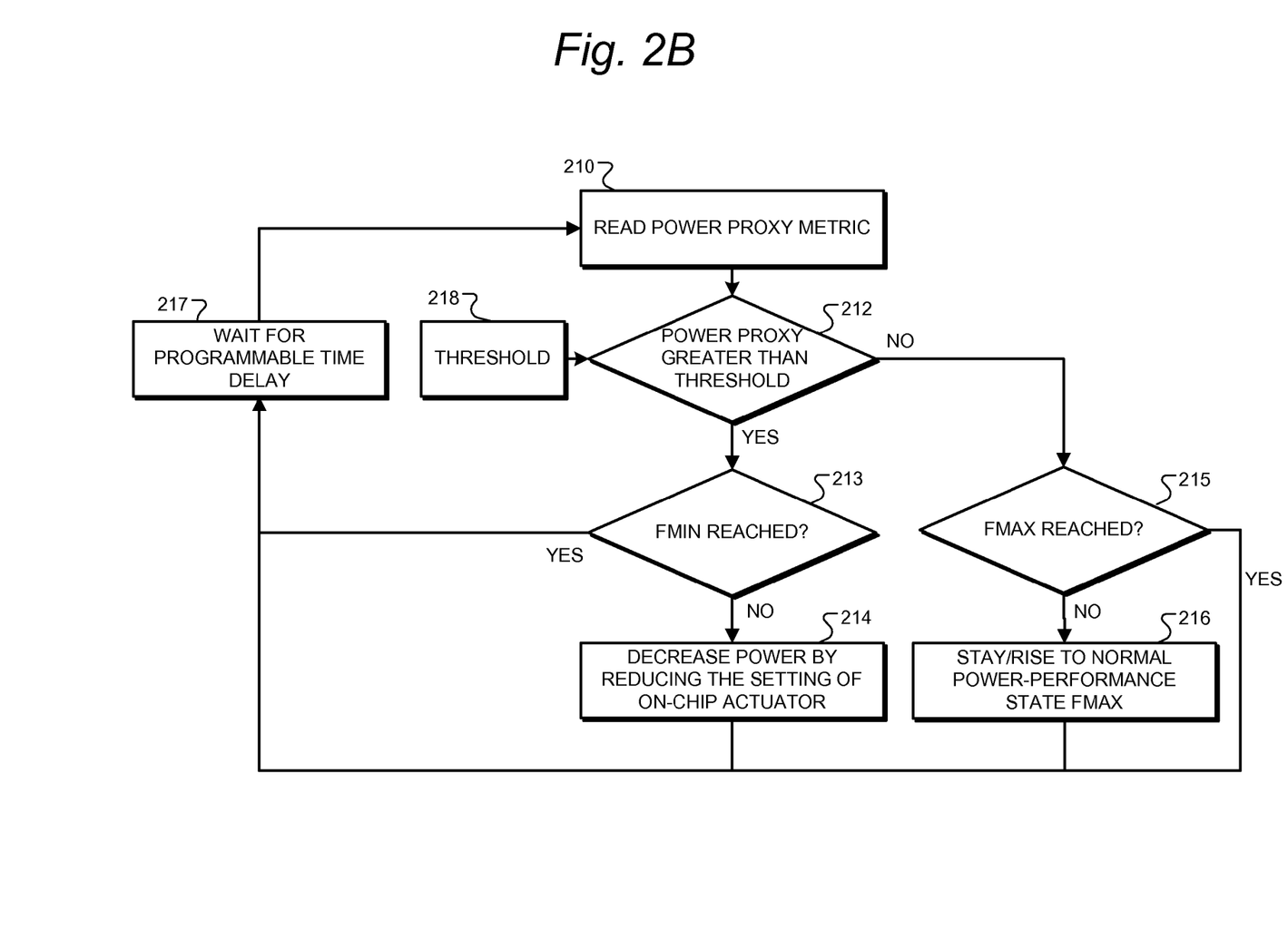
FIG. 2B shows a block diagram of a more complex implementation of a power-performance scheme according to another embodiment.

FIG. 2B is a block diagram of a more complex implementation of a processor core power-performance scheme according to another embodiment. The depicted scheme also takes place in the semiconductor device circuitry without intervention from software or firmware after setting of Fmax and Fmin. As used herein, when the process is set to take place without software or firmware intervention, this means that it is free from decisions, control, or calculations made by executable code running on the monitored processor core, or another microprocessor core in the system. Again, freedom from software intervention is preferable but not mandatory in every embodiment of the invention.

As shown in FIG. 2B, this process monitors core usage at block 210. Output from this step is a usage metric that is a measure of processor power or some proxy measure of processor power. Examples of such core usage metrics may include simple rate measures such as 'number of active cycles in a given interval' or 'number of completed instructions in a given interval of X cycles'. The depicted power proxy metric may involve metric values that are calculated from simpler metrics that are counted in core processor monitoring digital logic. The calculation, however, takes place in circuitry and is preferably not performed by the processor core or by any software process. The information passed from block 210 to block 212 may further include other metrics, such as temperature and power consumption, that are converted from measured analog values.

The process block 210 monitors core usage to determine ongoing values for the core usage metric(s), and to detect a change in this metric. Such a metric is produced by core fast-adjust circuitry such as circuitry 105 described (FIG. 1), and indicates a change in the core usage. As used herein, indicating a change in the core usage means that the metric indicates a change based on measuring, detecting, or monitoring core activity. The preferred version of such a metric is a power proxy metric. The change may result in a corresponding change of the power and performance state. In response to detecting the change at block 210, a desired next core performance state is selected using core performance state selection circuitry in the following process blocks. This selection preferably occurs in the performance state selection circuitry without receiving any data or control input from system software or firmware between detecting the change and selecting the desired next core performance state. That is, the registers are operatively coupled to the fast-adjust circuitry 105 such that during operation they continuously control the power-performance state set by circuitry 105 (in this embodiment by controlling operating frequency), independently of any instructions executed by the processor. After selecting the desired next core performance state, the method changes the power-performance state of the processor core using core performance actuator circuitry. This state change also happens without receiving any data or control input from system software or firmware between selecting the desired next core performance state and changing a performance state of the processor core.

To make the selection, the process at block 212 determines whether the power proxy metric is greater or less than a determined threshold, which is input at block 218. As explained, it is possible, but not employed in any preferred embodiments, that a metric proxy may have an inverse relationship to power, in which case the threshold relationship is inverted as well. If the power proxy metric is greater than the threshold, the process moves block 213, where it determines if the Fmin frequency (which is set in the Fmin register) is already set as the operating frequency in the core. If not, the process goes to block 214, which reduces the core operating frequency setting of the core's on-chip actuator, thereby reducing power consumption. After this, the process goes to block 217 where it waits for a programmable time delay. If the Fmin frequency was already reached at block 213, the process goes directly to the delay at block 217.

Back at block 212, if the power proxy metric is not greater than the threshold, the process goes to block 215, where it determines if the Fmax frequency (which is set in the Fmax register) has already been reached. If so, the process exits to the delay at block 217. If not, the process is allowed to further increase the core operating frequency and does so at block 216. Some embodiments increase the operating frequency in gradual steps by increasing the setting of the on chip actuator. Other embodiments may increase to Fmax in one step at block 216.

Preferably, the metrics and the compared-to thresholds are chosen such that they are appropriate at all power-performance states. By using digital circuitry rather than software and firmware, the system provides rapid response capability to changes in workload characteristics at the 10's of microseconds timescale (as opposed to at best 10's of millisecond timescale in current solutions). Further, the system complements the actuation control logic used in software or firmware.

Figure 3:
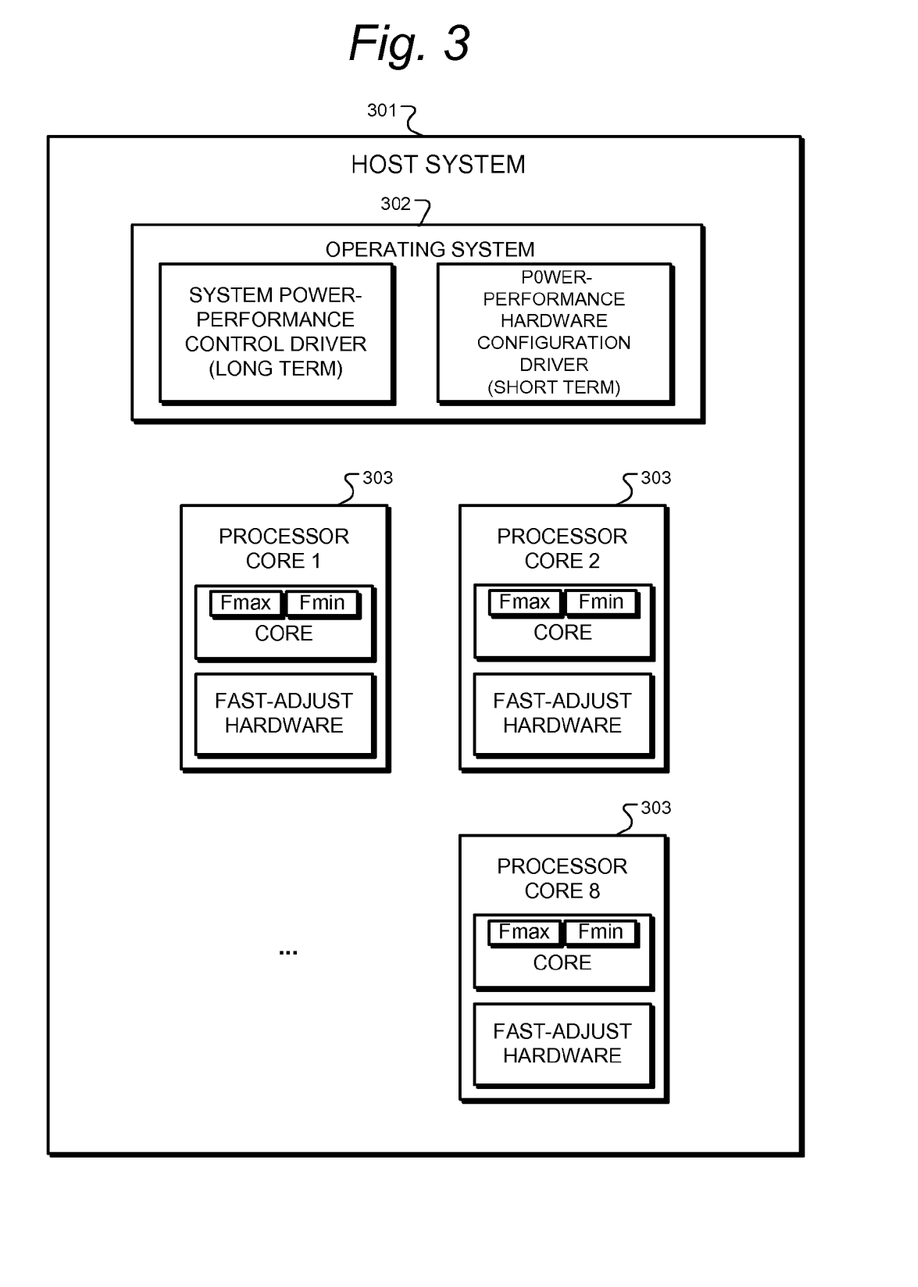
FIG. 3 shows a system level block diagram for a system with a multi-core processor device according to one embodiment.

FIG. 3 shows a software and hardware block diagram of a computer system according to one embodiment. As those of ordinary skill in the art will recognize, many, elements are of course left out of the diagram to avoid needless complexity. Circuits according the invention may be used in any suitable computer processor, such as for example PC processors, server processor, embedded or mobile processors, and including multiple-core processors which are becoming common in the art in all application areas. Further, the techniques taught herein may be employed with any combination of general-purpose processor cores, or dedicated cores such as DSP cores and floating point coprocessor cores.

The depicted system 301 includes an operating system 302 having installed therein a system power performance control driver and a hardware power-performance control driver. The system power-control driver typically includes performance control software that provides power and performance control over longer intervals of time than that done with the fast-change circuits herein. The hardware power-performance driver provides capability to program the fast adjust hardware included in the depicted processor cores with selected Fmax and Fmin values. In some scenarios, individual cores 303 have their Fmax and Fmin registers loaded with similar values such as when they are executing instruction threads from the same application, similar applications, or from the operating system, for example. Other scenarios include some cores 303 having Fmax, Fmin, or both values differing from those in other cores. A first such scenario is, of course, when different cores are executing different applications or threads having differing Fmax and Fmin requirements. In some instances, a particular application, or the operating system, may of course spawn a thread operating with a different priority than other threads, and may require differing Fmax and Fmin values for that thread. Of course, threads with the same priority may also have differing Fmax and Fmin values because of their workload, for example.

Depicted in FIG. 3 are multiple processor cores 303, each including both a hardware core and fast-adjust circuitry operatively coupled to the core. One preferred embodiment is an eight-core processor designed for high-performance servers. These processors may be provided in a package with two integrated circuit devices mounted to an interposer, each device having eight processor cores. The scope of the invention in various embodiments may, of course, include the entire host system including software and hardware.

Figure 4:
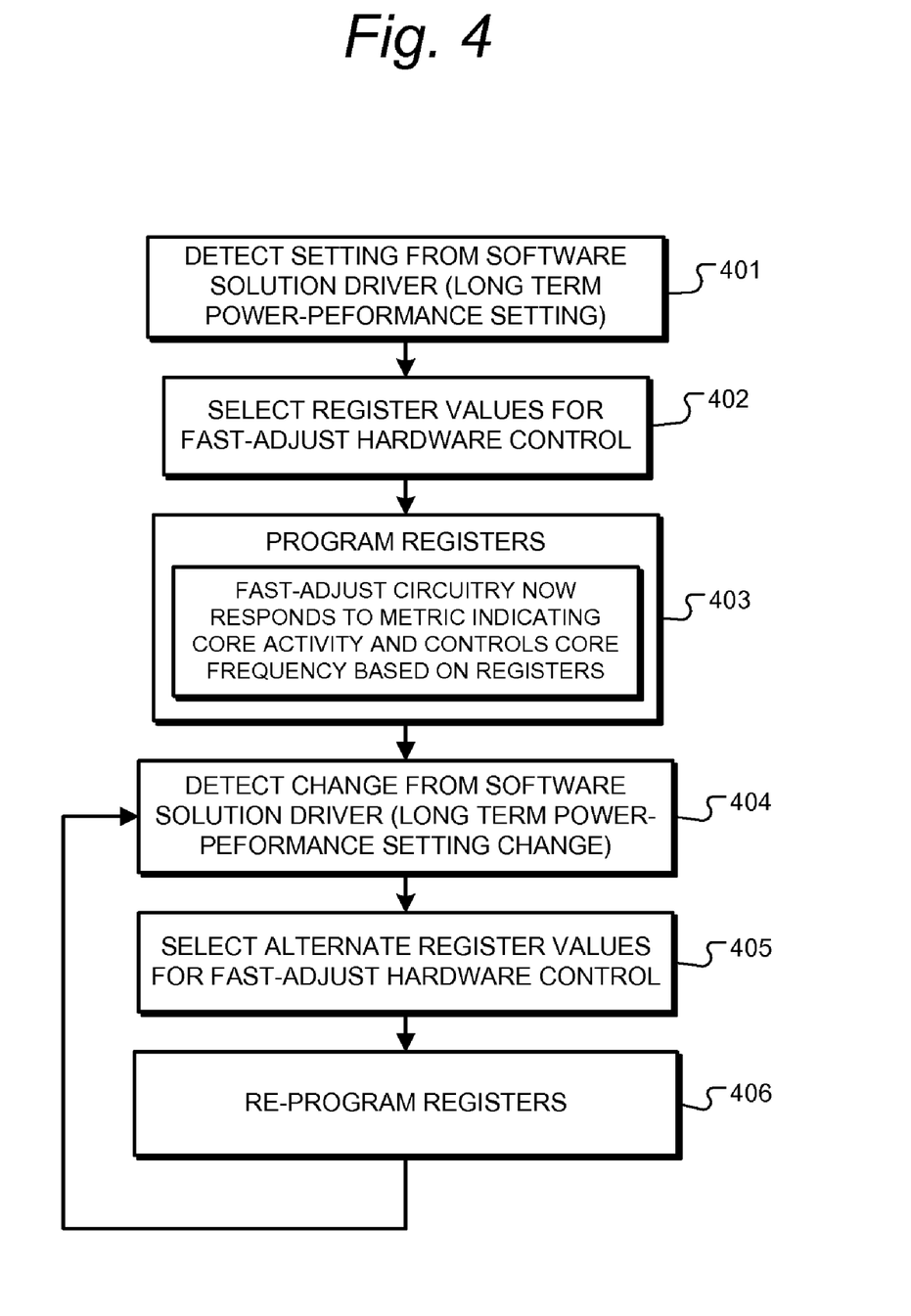
FIG. 4 shows a flow chart of a method of configuring fast-adjust hardware according to one embodiment.

FIG. 4 shows a flow chart of a method of configuring fast-adjust hardware according to one embodiment. The depicted method starts with block 401 where the power-performance configuration driver (FIG. 3) detects the long-term system setting from the system power-performance control software. In the case where these two software modules are compatible or integrated, this step consists of receiving or accessing the system setting, rather than detecting it. Based on the setting, the driver next selects a configuration data set including Fmax and Fmin values with which to configure the fast-adjust hardware control registers at block 402. In some embodiments, this step may include making a decision based on application requirements and other data, while other embodiments may receive specified selections from applications in order to select the register values. After selecting the data set, the driver programs to fast-adjust hardware at block 403 by writing specific the values to the special-purpose Fmax and Fmin registers included in each processor core.

After programming at block 403, the fast-adjust circuit is operational and runs automatically and independently from intervention with the configuration driver. That is, the fast-adjust circuitry now responds to the metric indicating core activity and controls the core frequency based on registers, independently of the processor core executing its instruction stream. At this point, the short term driver's role (FIG. 3) is to update the configuration settings of the fast-adjust hardware when needed. In the preferred embodiment that means setting Fmax and Fmin values when needed. This is done by detecting changes from software solution driver ("long-term" in FIG. 3), which may change a desired long-term power-performance setting for the system processor. This is not shown between step 403, but will occur before each iteration of step 404. The detection at block 404 may also include, of course, accepting user or application input to change the power-performance state. As explained previously, the software solution driver may be integrated with the hardware configuration driver in some embodiments.

In response to detecting a change in the long-term system power-performance settings, the power-performance configuration driver will select alternate register values, if required, at block 405. Next, at block 406, the power-performance configuration driver will reprogram the fast-adjust hardware control registers Fmax and Fmin with the selected data set. In some scenarios, the selection of Fmax and Fmin register values does not follow directly from software applications, such as when software is not functional to select such values, or when other system power concerns override or qualify requested values provided from an application. For example, suppose in block 401 that the system is a notebook PC that was booted with the AC power plugged in, and was therefore, in this example, initiated in to a high performance state from the system software solution driver. The fast-adjust hardware configuration driver would program appropriate selected Fmax and Fmin values into the fast adjust control registers. Now suppose in this scenario the PC were unplugged and the system power-performance software solution driver changed its power-performance setting to a lower power battery extended mode. The process at block 404 would detect a change, and select appropriate power-performance state values for Fmax and Fmin, and program the respective registers accordingly. Once set, these registers control automatic operation of the fast-adjust hardware. So while the system software solution is able to make long-term adjustments, the hardware circuitry solution provided herein, being embedded in the semiconductor device with processor core, is able to complement system software solution by making short-term adjustments, thus improving energy efficiency.

As another in-use operating scenario, the depicted process may detect at block 404 that a different software application is now executing in the relevant processor core, in which case the software solution driver may provide or set Fmax and Fmin values required by the processor. It should be noted regarding steps 404 and 405 that many embodiments may allow applications to provide a relative set of values for Fmax and Fmin at step 404, and then the process will translate those relative values into actual register values at step 405, typically through mapping onto a range of values the core is capable of achieving. Such a translation scheme allows much greater compatibility across different generations of software and hardware platforms. The relative values may be expressed as a percentage of maximum and minimum operating frequencies, or as a series of relative graduated steps. This further allows an application or the operating system to provide a single relative value which may be mapped by the power-performance hardware configuration driver to different values at different times, depending on other power-performance settings in the system. Another option is to provide a mapping of single power-performance selections, which are made available to software applications and operating systems in legacy systems, to match to selected sets of minimum and maximum frequency values as disclosed herein. This helps provide backward compatibility and more universal compatibility with power-performance schemes used by various software developers. The single power-performance setting may be, for example, a single frequency value or relative power-performance state such high, medium, or low. This is mapped by the power-performance configuration driver to a set of values including max frequency, min frequency, and possibly other values such as a frequency step-size and a processor core voltage max and min values. These values are then programmed into the hardware control registers as disclosed herein when the respective application is executing on the processor core(s).

As used herein, the terms "comprising," "including," "carrying," "having," "containing," "involving," and the like are to be understood to be open-ended, that is, to mean including but not limited to.

Any use of ordinal terms such as "first," "second," "third," etc., to refer to an element does not by itself connote any priority, precedence, or order of one element over another, or the temporal order in which acts of a method are performed. Rather, unless specifically stated otherwise, such ordinal terms are used merely as labels to distinguish one element having a certain name from another element having a same name (but for use of the ordinal term).

The above described preferred embodiments are intended to illustrate the principles of the invention, but not to limit the scope of the invention. Various other embodiments and modifications to these preferred embodiments may be made by those skilled in the art without departing from the scope of the present invention.

The invention claimed is:

1. A method for managing a power-performance range of a processor core, the method comprising:
   receiving a maximum processor frequency value and a minimum processor frequency value;
   setting the maximum processor frequency value in a first hardware register associated with a first processor core, and setting the minimum processor frequency value in a second hardware register associated with the first processor core, the first and second hardware registers operatively coupled to automatically direct power-performance control circuitry;
   executing, on the first processor core, instructions associated with a first software application;
   while executing the instructions associated with the first software application and independent of such execution, using the power-performance control circuitry to determine a processor core activity level of the first processor core, and
   control an operating frequency of the first processor core based on changes in the processor core activity level, with the power-performance control circuitry controlling the operating frequency of the first processor core to be in a range between the maximum processor frequency value and the minimum processor frequency value utilizing the first and second hardware registers; and adjusting a digital phase-locked loop circuit using the power-performance control circuitry.

2. The method of claim 1, further comprising pausing the power-performance control circuitry for a programmable time delay period after an adjustment of the operating frequency of the first processor core in response to determining the minimum processor frequency value has been reached or determining the maximum processor frequency value has been reached.

3. The method of claim 1, wherein,
said receiving comprises,
receiving a first maximum processor frequency value and a first minimum processor frequency value associated with the first software application, and
receiving a second maximum processor frequency value and a second minimum processor frequency value associated with a second software application;
said executing further comprises,
executing, on the first processor core, instructions associated with an operating system and the second software application;
said setting comprises,
setting the first maximum processor frequency value in the first hardware register and the first minimum processor frequency value in the second hardware register in association with an execution of the first software application, and
setting the second maximum processor frequency value in the first hardware register and the second minimum processor frequency value in the second hardware register in association with an execution of the second software application;
said using the power-performance control circuitry further comprises using the power-performance control circuitry while executing the instructions associated with the operating system, the first software application, and the second software application and independent of such execution to,
control the operating frequency of the first processor core, utilizing the power-performance control circuitry, to be in a range between the first maximum processor frequency value and the first minimum processor frequency value while executing the instructions associated with the first software application, and
control the operating frequency of the first processor core, utilizing the power-performance control circuitry, to be in a range between the second maximum processor frequency value and the second minimum processor frequency value while executing the instructions associated with the second software application.

4. The method of claim 1, in which the maximum processor frequency value and the minimum processor frequency value are associated with a power-performance state selected by a power-performance configuration driver.

5. The method of claim 1, further comprising loading a desired actuation step size indicator into an actuation step register for the purpose of controlling increase step sizes of the power-performance circuitry.

6. An integrated circuit device comprising:
a first processing circuit including a processor core, a first register, and a second register, the first register for storing an adjustable maximum frequency value for the processor core, and the second register for storing an adjustable minimum frequency value for the processor core, the processor core having an adjustable operating frequency;
fast-adjust circuitry operatively coupled to the processor core and operable to monitor a first selected ongoing usage-level metric of the processor core,
in response to the first selected ongoing usage-level metric having a first relationship to a determined threshold, and the minimum frequency value not already being reached, to decrease an operating frequency of the processor core, and in response to the first selected ongoing usage-level metric having a second relationship to the determined threshold, and the maximum frequency value not already being reached, to increase the operating frequency of the processor core;
wait for a programmable time delay in response to determining the minimum frequency value has been reached or determining the maximum frequency value has been reached; and
wherein operation of the fast-adjust circuitry is at least partially based on the values in the first and second registers, the first and second registers operatively coupled to automatically control the fast-adjust circuitry independently of instruction execution by the processor core.

7. The integrated circuit device of claim 6, further comprising:
a second processing circuit including a second processor core, a third register, and a fourth register, the third register for storing an adjustable maximum frequency value for the second processor core, and the fourth register for storing an adjustable minimum frequency value for the second processor core, the second processor core having an adjustable operating frequency;
second fast-adjust circuitry operatively coupled to the second processor core, and operable to
monitor a second selected ongoing usage-level metric of the second processor core,
in response to the second selected ongoing usage-level metric having the first relationship to a second determined threshold, and the minimum frequency value not already being reached, to decrease an operating frequency of the second processor core, and
in response to the second selected ongoing usage-level metric having the second relationship to the second determined threshold, and the maximum frequency value not already being reached, to increase the operating frequency of the second processor core; and
wherein operation of the second fast-adjust circuitry is at least partially based on the values in the third and fourth registers, the third and fourth registers operatively coupled to automatically control the second fast-adjust circuitry independently of instruction execution by the second processor core.

8. The integrated circuit device of claim 7, in which the device is adapted to be programmed with a power-performance configuration driver to adjust values in the first, second, third, and fourth registers.

9. The integrated circuit device of claim 6, wherein the fast-adjust circuitry is further operable to wait for a programmable timer delay period after decreasing or increasing the operating frequency of the processor core.

10. The integrated circuit device of claim 6, wherein the fast-adjust circuitry is further operable to make said increase or decrease in the operating frequency of the processor core within about 10 microseconds after a usage sequence in which the processor core achieves a usage-level metric corresponding to a change in operating frequency.

11. The integrated circuit device of claim 6, further comprising an actuation step register for receiving a desired actuation step size indicator from software or firmware and holding the desired actuation step size for the purpose of controlling increase step sizes of the fast-adjust circuitry frequency increases and decreases.

12. An integrated circuit device comprising:
a processor core;
core monitoring circuit means for providing one or more digital metric output values indicating selected ongoing usage-level metrics of the processor core;
core performance-state selection circuitry means for selecting a desired performance state from among at least two possible desired performance states, the core performance state selection circuitry means further comprising a first minimum frequency register for storing a first minimum frequency value, a second maximum frequency register for storing a second maximum frequency value, and means for automatically controlling, independently of instruction execution by the processor core, an operating frequency of the processor core to vary between the first minimum frequency value and the second maximum frequency value based on the one or more digital metric output values; and
power-performance configuration driver means for detecting a change in a long-term system power-performance setting and, in response, to a change in the values in the first minimum frequency register and the second maximum frequency register.

13. The integrated circuit device of claim 12 further comprising digital phase-locked loop actuator circuitry means for adjusting a core clock driving the processor core.

14. The integrated circuit device of claim 12, further comprising performance-level threshold comparison circuit means for comparing at least one of the one or more digital metric output values to a determined threshold level.

15. The integrated circuit of claim 12, wherein the power-performance configuration driver means is further adapted for translating first and second relative Fmin and Fmax values into absolute values for storage in the first minimum frequency register and the second maximum frequency register, respectively.

* * * * *